March 25, 1947.  A. B. ELLICOCK  2,418,017
ELECTRICAL PROTECTIVE DEVICE
Filed July 23, 1943
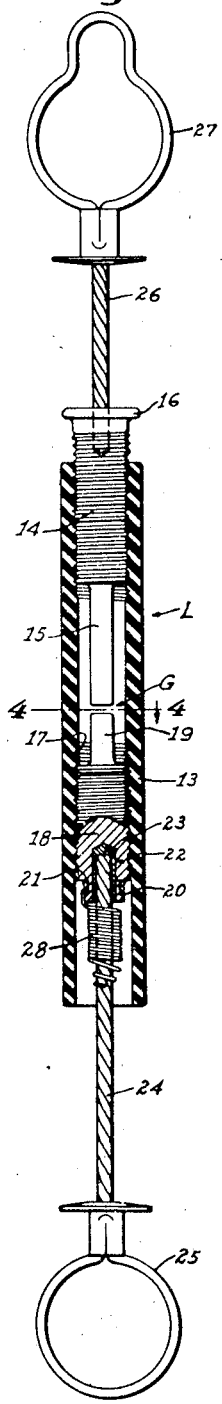
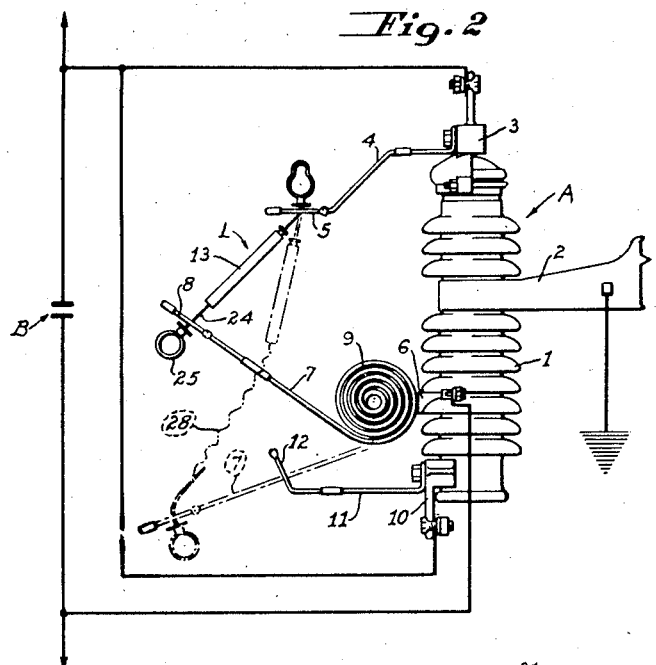
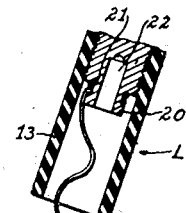
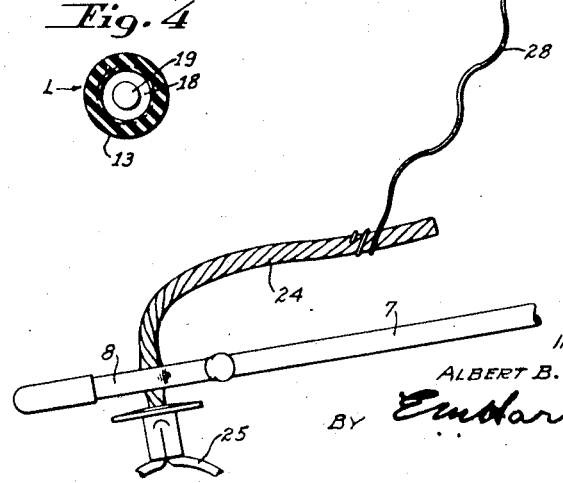
INVENTOR
ALBERT B. ELLICOCK
BY *E. M. Harrington*
ATTORNEY Patented Mar. 25, 1947

2,418,017

UNITED STATES PATENT OFFICE 2,418,017

ELECTRICAL PROTECTIVE DEVICE

Albert B. Ellicock, St. Louis, Mo., assignor to James R. Kearney Corporation, St. Louis, Mo., a corporation of Missouri Application July 23, 1943, Serial No. 495,810

4 Claims. (Cl. 200—118)

1

This invention relates generally to electrical protective devices, and more specifically to an electrical protective device having an improved gap link associated therewith and adapted for use in protecting a series capacitor from excessive voltages, the predominant object of the invention being to provide a gap link which is of such improved construction and arrangement, and is capable of such use, that the protection afforded a capacitor by a protective device of which the improved gap link forms a part, is materially increased.

When a capacitor associated with an alternating current circuit is connected in series with other electrical apparatus so that the current through the capacitor varies because of changing load conditions, line faults, etc., the voltage across the capacitor will vary proportionally, and any excessive current will be accompanied by an excessive voltage which may puncture or break down the dielectric of the capacitor unless some means is provided for protecting the capacitor from such excessive voltage. The protective device with which the improved gap link of the present invention is used affords such protection, in that on operation of said protective device, as a result of excess voltage across the capacitor, the capacitor is short-circuited. As will presently appear herein in greater detail, the protective device includes an arm which, when the protective device functions, is movable from its normal position to a capacitor short-circuiting position, and an important feature of the construction of the improved gap link of the present invention is that it includes means for maintaining the short-circuit across the capacitor while the movable arm of the protective device is moving from such normal position to such capacitor short-circuiting position so as to prevent excessive voltage being applied to the capacitor even during the short time required for the movable arm of the protective device to complete such movement.

Fig. 1 is a vertical sectional view of the improved gap link of this invention.

Fig. 2 is a diagrammatical view showing the protective device with which the gap link is used and the wiring which connects said protective device to the circuit with which it is electrically associated.

Fig. 3 is a fragmentary view partly in section and partly in elevation showing the lower portion of the gap link as it appears as the movable arm of the protective device moves downwardly on operation of said protective device.

2

Fig. 4 is a horizontal section taken on line 4—4 of Fig. 1.

In the drawing, wherein is shown for the purpose of illustration, merely, one embodiment of the invention, A designates a protective device generally which is adapted to protect a capacitor that is shown diagrammatically at B in Fig. 2. The protective device A comprises a suitable insulator 1 supported by a grounded hanger 2 which provides for atachment of the protective device to a suitable support (not shown). The insulator 1 has fixedly mounted thereon at its upper end a terminal 3, said terminal having secured thereto a relatively rigid contact arm 4 which is provided at its outer end with a rearwardly bent gap link gripping portion 5. Also, fixedly mounted on the insulator 1 is a second terminal 6 which has fixed thereto a movable contact arm 7 that is provided at its outer end with a rearwardly bent gap link gripping portion 8, said movable contact arm being formed from conductive, inherently resilient rod or wire material and being provided with an integral coiled portion 9 formed therein which tends to move the outer portion of the contact arm from the elevated position in which it is shown by full lines in Fig. 2 to the lowered position in which said contact arm is shown by dotted lines in that view.

Additionally, the insulator 1 has fixedly mounted thereon, at a point below the location of the terminal 6, a third terminal 10 which has fixed thereto a contact arm 11 that is provided with a portion 12 with which the contact arm 7 moves into electrical engagement when said contact arm moves downwardly in response to force exerted by the coiled portion 9 of said contact arm. The gap link gripping portions 5 and 8 of the contact arms 4 and 7, respectively, and the portion 12 of the contact arm 11, which receives in electrical contact therewith a portion of the movable contact arm 7 when said movable contact arm has moved to its lowered position, are preferably, though not necessarily, formed in accordance with the corresponding contact parts illustrated and described in United States Letters Patent No. 2,272,370, granted on February 10, 1942.

The protective device A includes a gap link L which is provided with a tube 13 formed of suitable insulating material, the upper portion of said tube being internally screwthreaded and said internally screwthreaded tube portion receiving an externally screwthreaded electrode 14 that is provided with a downwardly projected extension 15 of reduced diameter which is disposed within the tube 13, and an annular outwardly extended flange 16 at its upper end. A lower portion of the tube 13 also is internally screwthreaded, as indicated at 17, and the portion of the tube located below said screwthreaded tube portion 17 is of slightly greater inner diameter than the upper portion of the tube and is provided with a smooth inner face (see Fig. 1). Screwed into the internally screwthreaded tube portion 17 is a second electrode 18 which is provided with an extension 19 of reduced diameter that extends upwardly within the tube 13 from the screwthreaded portion of the electrode, the lower face of the extension 15 of the electrode 14 and the upper face of the extension 19 of the electrode 18 being spaced apart to provide a gap G therebetween which is enclosed by the tube 13.

The lower portion of the electrode 18 is provided with a downwardly projected extension 20 of reduced diameter and this extension has formed therein an annular groove 21. Also, the lower portion of the electrode 18 has a cavity 22 formed therein which extends through the extension 20 and into the body portion of the electrode, and disposed within said cavity is a body 23 of lead solder, or other suitable material having a low fusing point, in which is embedded the upper end portion of a conductor 24 that extends downwardly out of the tube 13 and has fixed to its lower end an eye 25. Likewise, the upper terminal 14 has suitably fixed thereto a conductor 26 which extends upwardly from said electrode 14 and has an eye 27 fixed to its upper end portion. Fixed to the extension 20 of the lower electrode 18 and turned several times thereabout in the groove 21 thereof is the upper end portion of a flexible conductor 28. The flexible conductor 28 extends from the groove 21 of the electrode 18 around the lower portion of the extension 20 of said electrode and is coiled about the conductor 24, the extreme lower end portion of said flexible conductor 28 being soldered, or otherwise secured, electrically and mechanically to said conductor 24.

When the protective device A is in condition for use the conductors 24 and 26 are engaged by the gripping portions 8 and 5 of the contact arms 7 and 4 so as to cause the outer portion of the contact arm 7 to be maintained in an elevated position in opposition to the force exerted by the coiled portion 9 of said contact arm which tends to move said outer portion of said contact arm downwardly. As shown diagrammatically in Fig. 2, the protective device is connected in parallel with the capacitor B, and the gap voltage of the gap link is above the maximum operating voltage of the capacitor, but below the maximum safe voltage of the capacitor. When the operating voltage across the capacitor rises to the break-down value of the gap G of the gap link, an arc forms between the extensions 15 and 19 of the electrodes 14 and 18 and effectively short-circuits the capacitor, the voltage across both the gap and the capacitor falling to a very low value as soon as the arc is established whereby the arc protects the capacitor.

If the arc were allowed to burn for any appreciable time, the electrodes would burn away and thus increase the gap spacing, and in an extreme case, the arc would be extinguished and the immediately resulting rise in voltage would damage the capacitor. Therefore, it is necessary to replace the arc with a metallic short-circuit, and this is accomplished by allowing the heat of the arc, which is transmitted to the electrode 18, to melt the body of solder 23 that secures the conductor 24 to said electrode 18. This melting of the body of solder 23 permits the conductor 24 to be pulled away from the electrode by the force exerted by the coiled portion of the movable contact arm 7, thus separating the gap link and allowing the movable contact arm 7 to move downwardly into electrical contact with the contact arm 11 so as to short-circuit the capacitor, as will be apparent from an inspection of Fig. 2.

It is important to note that the short-circuit of the capacitor must be maintained from the moment the arc is established across the gap G of the gap link L until the movable contact arm 7 of the protective device A has moved into electrical contact with the contact arm 11, and this is accomplished by the flexible conductor 28. If this flexible conductor were not employed as a part of the gap link the current through the link would be interrupted immediately as the conductor 24 would be separated from the electrode 18 and before the movable contact arm 7 of the protective device A made contact with the contact arm 11, and therefore the short-circuit across the capacitor would be removed for about $1/30$ second, or two cycles of the sixty cycle current. Hence, the excessive voltage would be applied to the capacitor for that period of time with a consequent danger that the capacitor would be damaged. However, by employing the flexible conductor 28, the short-circuit across the capacitor is maintained while the movable contact arm 7 is moving from its normal upward position to its lowered capacitor short-circuiting position where it contacts with the contact arm 11, the portion of said flexible conductor 28 which is coiled about the conductor 24 merely unwinding therefrom during such downward movement of the movable contact arm 7, and said movable contact arm 7 finally making contact with the contact arm 11 to establish a metallic short-circuit for the capacitor and also for the gap G of the gap link so as to extinguish the arc thereacross.

I claim:

1. A unitary gap link comprising a tube formed of electrical insulating material, spaced electrodes supported by and located within said tube to provide a gap therein which is adapted to break down to effect flow of current through the gap link only upon a predetermined voltage, fusible means associated with one of said electrodes which is fused by heat produced by passage of an electrical arc across the gap between said electrodes so as to cause separation of parts of said gap link, and a flexible conductor connected at its opposite ends to separable parts of said gap link, said flexible conductor being arranged in a contracted condition when said gap link is intact and being adapted to be drawn to a continuously extended condition upon separation of the separable parts of the gap link.

2. A unitary gap link comprising a tube formed of electrical insulating material, spaced electrodes supported by and located within said tube to provide a gap therein which is adapted to break down to effect flow of current through the gap link only upon a predetermined voltage, fusible means associated with one of said electrodes which is fused by heat produced by passage of an electrical arc across the gap between said electrodes so as to cause sepearation of parts of said gap link, and a flexible conductor connected at its opposite ends to separable parts of said gap link, said flexible conductor being coiled about a separable part of the gap link when said gap link is intact and being adapted to be unwound and drawn to an extended condition upon separation of the separable parts of the gap link.

3. A gap link for a protective device which is adapted to protect a capacitor from excessive voltages and which includes a pair of contact members one of which is movable from a normal position to a position where it makes contact with a capacitor short-circuiting contact, said gap link being adapted when intact for such contact engagement with the pair of contact members of a protective device with which it is functionally associated so as to maintain the movable contact member of the protective device in its normal position, and said gap link being adapted to separate on formation of an arc across the gap thereof and thereby release the movable contact member of the protective device for movement into contact with the capacitor short-circuiting contact, and means comprising a flexible conductor forming a part of said gap link which maintains the capacitor in a short-circuited condition during movement of the movable contact member of the protective device from its normal position to a position where it makes contact with the capacitor short-circuiting contact, said flexible conductor being normally arranged in a contracted condition and being adapted to be drawn to a continuously extended condition during movement of the movable contact member of the protective device.

4. A gap link for a protective device which is adapted to protect a capacitor from excessive voltages and which includes a pair of contact members one of which is movable from a normal position to a position where it makes contact with a capacitor short-circuiting contact, said gap link being adapted when intact for such contact engagement with the pair of contact members of a protective device with which it is functionally associated so as to maintain the movable contact member of the protective device in its normal position, and said gap link being adapted to separate on formation of an arc across the gap thereof and thereby release the movable contact member of the protective device for movement into contact with the capacitor short-circuiting contact, and means comprising a flexible conductor forming a part of said gap link which maintains the capacitor in a short-circuited condition during movement of the movable contact member of the protective device from its normal position to a position where it makes contact with the capacitor short-circuiting contact, said flexible conductor being normally coiled about a part of said gap link and being adapted to unwind therefrom during movement of the movable contact member of the protective device.

ALBERT B. ELLICOCK.

REFERENCES CITED

The following references are of record in the file of this patent:

UNITED STATES PATENTS

| Number | Name | Date |
| --- | --- | --- |
| 2,307,598 | Marbury | Jan. 5, 1943 |
| 2,174,477 | Pittman et al. | Sept. 26, 1939 |
| 2,305,436 | McMorris | Dec. 15, 1942 |
| 2,315,320 | Earle | Mar. 30, 1943 |
| 607,251 | Lewis | July 12, 1898 |
| 283,492 | Kinsman | Aug. 21, 1883 |
| 1,526,770 | Brain | Feb. 17, 1925 |
| 2,152,864 | Boothe | Apr. 4, 1939 |

FOREIGN PATENTS

| Number | Country | Date |
| --- | --- | --- |
| 394,962 | British | June 31, 1933 |